United States Patent
Gu et al.

(10) Patent No.: US 9,526,018 B2
(45) Date of Patent: Dec. 20, 2016

(54) METHOD FOR MAINTAINING BASE STATION, DEVICE, AND SYSTEM

(71) Applicant: Huawei Technologies Co., Ltd., Shenzhen, Guangdong (CN)

(72) Inventors: Zhinong Gu, Shanghai (CN); Longxin Liu, Shanghai (CN); Lijin Cao, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/709,888

(22) Filed: May 12, 2015

(65) Prior Publication Data

US 2015/0245229 A1    Aug. 27, 2015

Related U.S. Application Data (63) Continuation of application No. PCT/CN2012/084570, filed on Nov. 14, 2012.

(51) Int. Cl.
| | |
|---|---|
| *H04W 24/00* | (2009.01) |
| *H04W 24/04* | (2009.01) |
| *H04L 12/24* | (2006.01) |
| *H04W 24/02* | (2009.01) |
| *H04W 88/12* | (2009.01) |

(52) U.S. Cl.
CPC .......... *H04W 24/04* (2013.01); *H04L 41/0668* (2013.01); *H04L 41/0672* (2013.01); *H04W 24/02* (2013.01); *H04W 88/12* (2013.01)

(58) Field of Classification Search
CPC . H04L 41/0668; H04L 41/0672; H04W 24/02; H04W 88/12; H04W 24/00; H04W 28/00; H04W 74/00; H04W 28/18; H04W 24/04

USPC .......... 455/419, 423, 434, 449, 456.5, 515; 370/216

See application file for complete search history.

(56) References Cited

U.S. PATENT DOCUMENTS

| | | | |
|---|---|---|---|
| 6,199,074 B1* | 3/2001 | Kern | .................... G06F 11/2058 |
| 6,768,726 B2* | 7/2004 | Dorenbosch | ...... H04W 36/0011 370/331 |

(Continued)

FOREIGN PATENT DOCUMENTS

| | | |
|---|---|---|
| CN | 101170787 A | 4/2008 |
| CN | 101237664 A | 8/2008 |

(Continued)

*Primary Examiner* — Mong-Thuy Tran (57) ABSTRACT

The present invention discloses a method for maintaining a base station, a device, and a system. The method includes: if a first operation and maintenance OM channel between a network management system NMS device and a first base station is in an interrupted state, determining, by the NMS device, whether a second channel between the NMS device and the first base station, sending, by the NMS device, an operation and maintenance command to the first base station through the second channel to perform operation and maintenance on the first base station. In the technical solutions of embodiments of the present invention, when the first OM channel is in an interrupted state, it may be not required to instruct operation and maintenance personnel to visit a site and perform an operation, so that costs of the site visit by the personnel are reduced, and a speed of response to a fault can be also increased.

17 Claims, 3 Drawing Sheets

(56) References Cited

U.S. PATENT DOCUMENTS

| | | | |
|---|---|---|---|
| 2005/0144316 A1* | 6/2005 | Loo | H04Q 3/0079 709/238 |
| 2006/0153068 A1* | 7/2006 | Dally | H04L 1/22 370/219 |
| 2007/0249341 A1* | 10/2007 | Chu | H04W 16/02 455/434 |
| 2009/0149169 A1* | 6/2009 | Tanno | H04B 1/7083 455/422.1 |
| 2009/0248475 A1* | 10/2009 | Choi | G06Q 10/107 709/219 |
| 2010/0088440 A1* | 4/2010 | Banks | G06F 11/2028 710/109 |
| 2010/0110885 A1* | 5/2010 | Qin | H04L 12/24 370/228 |
| 2010/0223504 A1* | 9/2010 | DeHaan | G06F 11/2294 714/37 |
| 2012/0124629 A1* | 5/2012 | Musick | H04N 21/2402 725/95 |
| 2013/0012249 A1* | 1/2013 | Centonza | H04W 72/0426 455/501 |
| 2013/0136015 A1* | 5/2013 | Ojala | H04L 5/001 370/252 |
| 2015/0156707 A1* | 6/2015 | Gunnarsson | H04B 1/7083 455/434 |

FOREIGN PATENT DOCUMENTS

| | | |
|---|---|---|
| CN | 101909316 A | 12/2010 |
| CN | 102711160 A | 10/2012 |
| JP | 2002-44039 | 2/2002 |
| WO | WO 2011/113467 A1 | 9/2011 |

* cited by examiner

METHOD FOR MAINTAINING BASE STATION, DEVICE, AND SYSTEM

CROSS-REFERENCE TO RELATED APPLICATIONS

This application is a continuation of International Application No. PCT/CN2012/084570, filed on Nov. 14, 2012, which is hereby incorporated by reference in its entirety.

TECHNICAL FIELD

The present invention relates to the field of communications technologies, and in particular, to a method for maintaining a base station, a device, and a system.

BACKGROUND

In an existing communications network, operation and maintenance on a base station is performed by using an operation and maintenance (operation and maintenance, OM) channel between a network management system (network management system, NMS) device and the base station. In an actual running process, the OM channel may be interrupted due to a fault in software or hardware of the base station or a fault in a transmission network of the OM channel, and the base station device cannot be remotely diagnosed or maintained. In this case, people need to visit the base station to perform near-end troubleshooting. Under this circumstance, the base station device is reset to reinitialize the software or hardware, and generally, the interrupted OM channel can be recovered, and normal operation and maintenance is continued.

In the prior art, when detecting that the OM channel between the NMS device and the base station is interrupted, the NMS device instructs operation and maintenance personnel to visit the base station, to perform an operation such as resetting the base station or unplugging and inserting a board, so as to rectify the fault; or, when detecting that the OM channel between the base station and the NMS is interrupted and that a service channel is fully interrupted, the base station actively performs reset, to attempt to recover the OM channel. However, in the prior art, at least the following technical defects exist: in a situation in which the OM channel is interrupted and the service channel is partially normal, the base station does not perform an active reset operation, and in this case, people still need to visit the base station to perform an operation. This causes significant site visit costs, and also easily leads to customer dissatisfaction because a response speed of the people is relatively slow and it generally takes several hours to rectify the fault.

SUMMARY

Embodiments of the present invention provide a method for maintaining a base station, a device, and a system. Therefore, when an operation and maintenance OM channel is interrupted, it may be not required to instruct personnel to visit a site and perform an operation, thereby implementing remote maintenance of a base station.

The embodiments of the present invention may be specifically implemented by using the following technical solutions.

According to a first aspect, a method for maintaining a base station is provided, where the method includes:

if a first operation and maintenance OM channel between a network management system NMS device and a first base station is in an interrupted state, determining, by the NMS device, whether a second channel between the NMS device and the first base station is available, or whether a third channel between the NMS device and the first base station is available, where the second channel includes a channel between the first base station and a second base station and a second OM channel between the second base station and the NMS device, and the third channel includes a channel between the first base station and a core network node and a third OM channel between the core network node and the NMS device; and if the second channel between the NMS device and the first base station is available, sending, by the NMS device, an operation and maintenance command to the first base station through the second channel to perform operation and maintenance on the first base station; or, if the third channel between the NMS device and the core network node is available, sending, by the NMS device, an operation and maintenance command to the first base station through the third channel to perform operation and maintenance on the first base station.

In the technical solution of the embodiments of the present invention, when a first operation and maintenance OM channel between a network management system NMS device and a first base station is in an interrupted state, the NMS device may send an operation and maintenance command to the first base station through a second channel between the NMS device and the first base station or a third channel between the NMS device and the first base station, to perform operation and maintenance on the first base station. Therefore, it is not required to instruct operation and maintenance personnel to visit a site and perform an operation, so that costs of the site visit by the personnel are reduced, and a speed of response to a fault can be also increased. In addition, in a case in which the first base station cannot perform active reset or the first OM channel cannot be recovered by means of active reset, operation and maintenance can be still performed on the first base station by using the second channel or the third channel in the technical solution provided by the embodiments of the present invention.

With reference to the first aspect, in a first possible implementation manner of the first aspect, that the first OM channel between the NMS device and the first base station is in an interrupted state includes: the NMS device preconfigures one of the following active reset conditions for the first base station, and when the active reset condition is met and after the first base station performs an active reset operation, the first OM channel is still in an interrupted state, where the active reset conditions include:

if the first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

With reference to the first aspect or the first possible implementation manner of the first aspect, in a second possible implementation manner of the first aspect, the sending, by the NMS device, an operation and maintenance command to the first base station through the second channel or the third channel to perform operation and maintenance on the first base station includes:

sending, by the NMS device, a reset command to the first base station through the second channel or the third channel, to instruct the first base station to perform a reset operation; or sending, by the NMS device, a status query command to the first base station through the second channel or the third channel, to acquire device status information of the first base station; or sending, by the NMS device, a log upload command to the first base station through the second channel or the third channel, to acquire local logs recorded by the first base station, where the local logs include an operation and maintenance log and a run log that are recorded by the first base station.

With reference to the second possible implementation manner of the first aspect, in a third possible implementation manner of the first aspect, the acquiring, by the NMS device, local logs recorded by the first base station includes:

acquiring, by the NMS device, the local logs through the second channel or the third channel; or if the first OM channel has already recovered to a normal state after the NMS device sends the operation and maintenance command to the first base station through the second channel or the third channel to perform the operation and maintenance on the first base station, acquiring, by the NMS device, the local logs through the recovered first OM channel.

According to a second aspect, a method for maintaining a base station is further provided, where the method includes:

receiving, by a first base station, an operation and maintenance command that is sent, when a second channel between a network management system NMS device and the first base station is available, by the NMS device through the second channel; or, receiving, by the first base station, an operation and maintenance command that is sent, when a third channel between the NMS device and the first base station is available, by the NMS device through the third channel, where the second channel includes a channel between the first base station and a second base station and a second operation and maintenance OM channel between the second base station and the NMS device, and the third channel includes a channel between the first base station and a core network node and a third operation and maintenance OM channel between the core network node and the NMS device; and implementing, by the first base station according to the operation and maintenance command, operation and maintenance of the NMS device on the first base station.

In the technical solution of the embodiments of the present invention, when the first OM channel between the first base station and the NMS device is in an interrupted state, the first base station may receive, through the second channel or the third channel, the operation and maintenance command sent by the NMS device, and implement, according to the operation and maintenance command, the operation and maintenance of the NMS device on the first base station. Therefore, it is not required to wait for operation and maintenance personnel to visit a site and perform an operation, so that costs of the site visit by the personnel are reduced, and a speed of response to a fault can be also increased. In addition, in a case in which the first base station cannot perform active reset or the first OM channel cannot be recovered by means of active reset, operation and maintenance can be still implemented on the first base station by using the second channel or the third channel in the technical solution provided by the embodiments of the present invention.

With reference to the second aspect, in a first possible implementation manner of the second aspect, before that the first base station receives the operation and maintenance command that is sent by the NMS device through the second channel or the third channel, the method further includes:

accepting, by the first base station, one of the following active reset conditions pre-configured by the NMS device for the first base station, and when the active reset condition is met, performing, by the first base station, an active reset operation, where the active reset conditions include:

if a first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

With reference to the second aspect or the first possible implementation manner of the second aspect, in a second possible implementation manner of the second aspect, before the implementing, by the first base station according to the operation and maintenance command, operation and maintenance of the NMS device on the first base station, the method further includes:

determining, by the first base station, that the first OM channel between the first base station and the NMS device is in an interrupted state.

With reference to the second aspect or either one of the first and the second possible implementation manners of the second aspect, in a third possible implementation manner of the second aspect, the implementing, by the first base station according to the operation and maintenance command, operation and maintenance of the NMS device on the first base station includes:

performing, by the first base station, a reset operation according to a reset command sent by the NMS device; or reporting, by the first base station, device status information of the first base station to the NMS device according to a status query command sent by the NMS device; or uploading, by the first base station, local logs recorded by the first base station to the NMS device according to a log upload command sent by the NMS device, where the local logs include an operation and maintenance log and a run log that are recorded by the first base station.

With reference to the third possible implementation manner of the second aspect, in a fourth possible implementation manner of the second aspect, the uploading, by the first base station, local logs recorded by the first base station to the NMS device according to a log upload command sent by the NMS device includes:

uploading, by the first base station, the local logs to the NMS device through the second channel or the third channel; or if the first OM channel has already recovered to a normal state after the first base station implements, according to the operation and maintenance command, the operation and maintenance of the NMS device on the first base station, reporting, by the first base station, the local logs recorded by the first base station to the NMS device through the recovered first OM channel.

According to a third aspect, a network management system NMS device is provided, including:

a processor, configured to: when a first operation and maintenance OM channel between the NMS device and a first base station is in an interrupted state, determine whether a second channel between the NMS device and the first base station is available, or whether a third channel between the NMS device and the first base station is available, where the second channel includes a channel between the first base station and a second base station and a second OM channel between the second base station and the NMS device, and the third channel includes a channel between the first base station and a core network node and a third OM channel between the core network node and the NMS device; and a transmitter, configured to send an operation and maintenance command to the first base station through the second channel or the third channel to perform operation and maintenance on the first base station.

With reference to the third aspect, in a first possible implementation manner of the third aspect, the processor is further configured to pre-configure one of the following active reset conditions for the first base station, to attempt to recover the first OM channel, where the active reset conditions include:

if the first OM channel is in an interrupted state, and the channel between the first base station and the second base station is also in an interrupted state, the first base station performs an active reset operation; or if the first OM channel is in an interrupted state, and the channel between the first base station and the core network node is also in an interrupted state, the first base station performs an active reset operation; or if the first OM channel is in an interrupted state, and both the channel between the first base station and the second base station and the channel between the first base station and the core network node are in an interrupted state, the first base station performs an active reset operation.

With reference to the third aspect or the first possible implementation manner of the third aspect, in a second possible implementation manner of the third aspect, the transmitter is further configured to send a reset command to the first base station through the second channel or the third channel, to instruct the first base station to perform a reset operation; or the transmitter is further configured to send a status query command to the first base station through the second channel or the third channel, to acquire device status information of the first base station; or the transmitter is further configured to send a log upload command to the first base station through the second channel or the third channel, to acquire local logs recorded by the first base station, where the local logs include an operation and maintenance log and a run log that are recorded by the first base station.

With reference to the third aspect or either one of the first and the second possible implementation manners of the third aspect, in a third possible implementation manner of the third aspect, the NMS device further includes:

a receiver, configured to:

receive the device status information of the first base station; or receive the local logs recorded by the first base station, where the local logs include the operation and maintenance log and the run log that are recorded by the first base station.

According to a fourth aspect, a base station is provided, including:

a receiver, configured to receive an operation and maintenance command that is sent, when a second channel between a network management system NMS device and the first base station is available, by the NMS device through the second channel; or, the receiver is configured to receive an operation and maintenance command that is sent, when a third channel between the NMS device and the first base station is available, by the NMS device through the third channel, where the second channel includes a channel between the first base station and a second base station and a second OM channel between the second base station and the NMS device, and the third channel includes a channel between the first base station and a core network node and a third OM channel between the core network node and the NMS device; and a processor, configured to implement, according to the operation and maintenance command, operation and maintenance of the NMS device on the first base station.

With reference to the fourth aspect, in a first possible implementation manner of the fourth aspect, the receiver is further configured to receive, through the second channel or the third channel, a log upload command sent by the NMS device; or the receiver is further configured to receive, through the second channel or the third channel, a status query command sent by the NMS device; or the receiver is further configured to receive, through the second channel or the third channel, a log upload command sent by the NMS device.

With reference to the fourth aspect or the first possible implementation manner of the fourth aspect, in a second possible implementation manner of the fourth aspect, the processor is further configured to accept one of the following active reset conditions pre-configured by the NMS device for the first base station, and when the active reset condition is met, perform an active reset operation, where the active reset conditions include:

if a first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

With reference to the fourth aspect or either one of the first and the second possible implementation manners of the fourth aspect, in a third possible implementation manner of the fourth aspect, the processor is further configured to: before the processor implements, according to the operation and maintenance command, the operation and maintenance of the NMS device on the first base station, determine that the first OM channel between the first base station and the NMS device is in an interrupted state.

With reference to the fourth aspect or any one of the first to the third possible implementation manners of the fourth aspect, in a fourth possible implementation manner of the fourth aspect, the base station further includes:

a transmitter, configured to:

report device status information of the first base station to the NMS device; or upload local logs recorded by the first base station to the NMS device, where the local logs include an operation and maintenance log and a run log that are recorded by the first base station.

According to a fifth aspect, a communications system is provided, including:

the network management system NMS device provided in the third aspect or any one of the first to the third possible implementation manners of the third aspect, and the base station provided in the fourth aspect or any one of the first to the fourth possible implementation manners of the fourth aspect.

Compared with the prior art, by using the NMS device provided in the third aspect, or the base station provided in the fourth aspect, or the system provided in the fifth aspect, when a first operation and maintenance OM channel between the network management system NMS device and the first base station is in an interrupted state, the NMS device may send an operation and maintenance command to the first base station through a second channel between the NMS device and the first base station or a third channel between the NMS device and the first base station, to perform operation and maintenance on the first base station. Therefore, it is not required to instruct operation and maintenance personnel to visit a site and perform an operation, so that costs of the site visit by the personnel are reduced, and a speed of response to a fault can be also increased. In addition, in a case in which the base station cannot perform active reset or the first OM channel cannot be recovered by means of active reset, operation and maintenance can be still performed on the first base station by using the second channel or the third channel in the technical solutions provided by the embodiments of the present invention.

DETAILED DESCRIPTION

To make the objectives, technical solutions, and advantages of the present invention clearer and more comprehensible, the following further describes the technical solutions provided by the present invention in detail with reference to the accompanying drawings and embodiments.

The technical solutions provided by the embodiments of the present invention may be applied to various communications networks, such as: a Global System for Mobile Communications (global system for mobile communication, GSM) system, a Code Division Multiple Access (code division multiple access, CDMA) system, a Universal Mobile Telecommunications System (universal mobile telecommunication system, UMTS) system, a Long Term Evolution (long term evolution, LTE) system, a Long Term Evolution Advanced (long term evolution advanced, LTE-A) and the like. The terms "network" and "system" are exchangeable. In the embodiments of the present invention, a base station (base station, BS) may be a site that communicates with a user equipment (user equipment, UE) or another communications site such as a repeater site, and the base station may provide communications coverage for a specific physical area. Specifically, in the GSM system, the base station may be a base transceiver station (base transceiver station, BTS); in the UMTS system, the base station may be a NodeB (Node B); in the LTE system, the base station may be an evolved NodeB (evolved Node B, eNode B).

Figure 1:
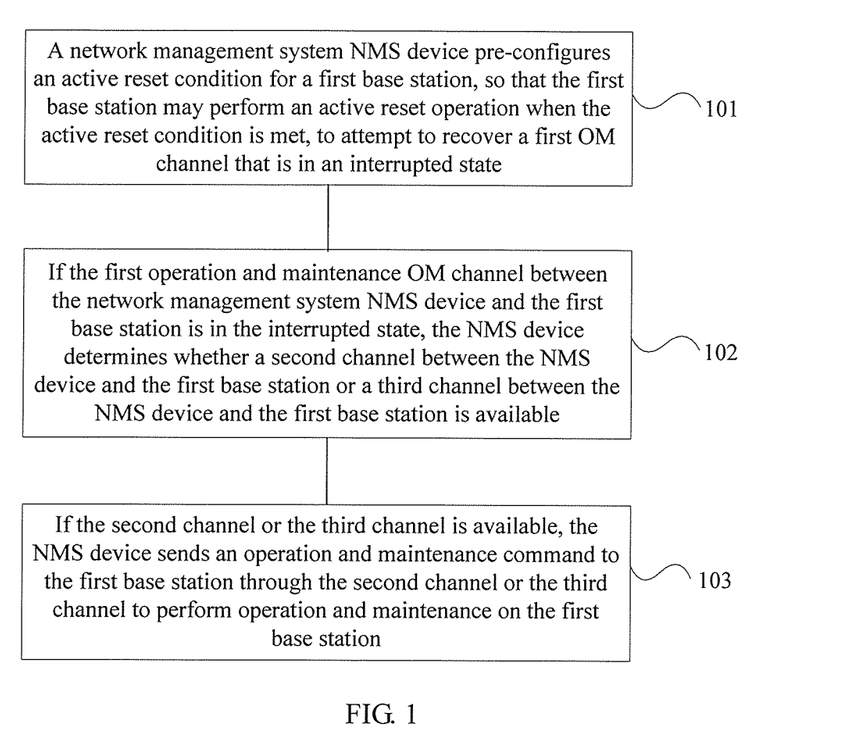
FIG. 1 is a flowchart of a method for maintaining a base station according to an embodiment of the present invention.

Referring to FIG. 1, a method for maintaining a base station according to an embodiment of the present invention includes:

Step 102: If a first operation and maintenance OM channel between a network management system NMS device and a first base station is in an interrupted state, the NMS device determines whether a second channel between the NMS device and the first base station is available, or whether a third channel between the NMS device and the first base station is available.

In step 102, the second channel includes a channel between the first base station and a second base station and a second OM channel between the second base station and the NMS device, and the third channel includes a channel between the first base station and a core network node and a third OM channel between the core network node and the NMS device.

Step 103: If the second channel between the NMS device and the first base station is available, the NMS device sends an operation and maintenance command to the first base station through the second channel to perform operation and maintenance on the first base station; or, if the third channel between the NMS device and the core network node is available, the NMS device sends an operation and maintenance command to the first base station through the third channel to perform operation and maintenance on the first base station.

That the NMS device sends an operation and maintenance command to the first base station through the second channel or the third channel to perform operation and maintenance on the first base station may be specifically: performing the operation and maintenance on the first base station by using the second channel or the third channel, so as to temporarily replace the first OM channel that is in an interrupted state; or, performing the operation and maintenance on the first base station by using the second channel or the third channel, so as to recover the first OM channel that is in an interrupted state. The operation and maintenance may include but is not limited to the following functions: configuration management, fault management, performance management, security management, software management, site deployment manage, device management, remote electrical tilt antenna management, inventory management, and commissioning management.

In the technical solution of this embodiment of the present invention, when a first operation and maintenance OM channel between a network management system NMS device and a first base station is in an interrupted state, the NMS device may send an operation and maintenance command to the first base station through a second channel between the NMS device and the first base station or a third channel between the NMS device and the first base station, to perform operation and maintenance on the first base station. Therefore, it is not required to instruct operation and maintenance personnel to visit a site and perform an operation, so that costs of the site visit by the personnel are reduced, and a speed of response to a fault can be also increased. In addition, in a case in which the first base station cannot perform active reset or the first OM channel cannot be recovered by means of active reset, operation and maintenance can be still performed on the first base station by using the second channel or the third channel in the technical solution provided by this embodiment of the present invention.

That the NMS device sends an operation and maintenance command to the first base station through the second channel or the third channel to perform operation and maintenance on the first base station may specifically include:

sending, by the NMS device, a reset command to the first base station through the second channel or the third channel, to instruct the first base station to perform a reset operation; or sending, by the NMS device, a status query command to the first base station through the second channel or the third channel, to acquire device status information of the first base station; or sending, by the NMS device, a log upload command to the first base station through the second channel or the third channel, to acquire local logs recorded by the first base station, where the local logs include an operation and maintenance log and a run log that are recorded by the first base station.

The acquiring, by the NMS device, local logs recorded by the first base station may specifically include:

acquiring, by the NMS device, the local logs through the second channel or the third channel; or if the first OM channel has already recovered to a normal state after the NMS device sends the operation and maintenance command to the first base station through the second channel or the third channel to perform the operation and maintenance on the first base station, acquiring, by the NMS device, the local logs through the recovered first OM channel.

Generally, the first base station may perform the reset operation to recover the first OM channel to the normal state. In a case in which the first base station does not support an active reset operation, or in a case in which an active reset condition is not met although the first base station supports the active reset operation, the NMS device may send the reset command to the first base station, so as to instruct the first base station to perform the reset operation.

In addition, the NMS device may further send the status query command to the first base station, to acquire the device status information of the first base station; or, the NMS device may further send the log upload command to the first base station, to acquire the local logs recorded by the first base station, where the local logs include the operation and maintenance log and the run log that are recorded by the first base station. The operation and maintenance log is generally triggered by the NMS device, and may specifically include the operation and maintenance command executed by the first base station, an obtained operation and maintenance result, and feedback information for the NMS device; the run log is generally triggered by an event, and may include various exceptions in a running process of the first base station, for example, an event caused by a status change of a device, transmission, or an air interface resource. The NMS device may fast analyze and locate a problem by acquiring the device status information of the first base station or the local logs, so as to help determine a reason why the first OM channel is interrupted. For example, the NMS device may learn, by acquiring the local logs, that the reason why the first OM channel is interrupted is transmission interruption, or a Media Access Control (medium access control, MAC) address exception, or another reason, so as to perform troubleshooting correspondingly.

In addition, optionally, before the step 102 is executed, the method may further include:

Step 101: The NMS device pre-configures one of the following active reset conditions for the first base station, where the active reset conditions include:

if the first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

In an actual operation, the NMS device may correspondingly pre-configure one of the active reset conditions for the first base station according to a different networking architecture of a communications network; when the active reset condition is met, the first base station performs the active reset operation, to attempt to recover the first OM channel. Then, if the first OM channel is recovered, the NMS device may perform operation and maintenance on the first base station by using the recovered first OM channel; if the first OM channel is still in an interrupted state, the foregoing step 102 and step 103 may be executed, and operation and maintenance is performed on the first base station by using the second channel or the third channel. The following uses examples for description with reference to different networking architectures.

Scenario 1: It is assumed that, in a networking architecture, the NMS device can perform operation and maintenance on the first base station only by using the channel between the first base station and the second base station, and cannot perform operation and maintenance on the first base station by using the channel between the first base station and the core network node. The active reset condition that is configured by the NMS device for the first base station may be that: if the first OM channel is in an interrupted state, and the channel between the first base station and the second base station is also in an interrupted state, the first base station performs the active reset operation.

It is easy to understand that, in this case, if both the first OM channel and the channel between the first base station and the second base station are in an interrupted state, the NMS device cannot perform operation and maintenance on the first base station by using the second channel. If the first base station cannot perform the active reset operation, personnel need to visit a site for troubleshooting. Therefore, the NMS device may pre-configure the active reset condition for the first base station, so that the first base station can perform the active reset operation in the foregoing case and it is not required to wait for the personnel to visit the site for troubleshooting.

Scenario 2: It is assumed that, in a networking architecture, the NMS device can perform operation and maintenance on the first base station only by using the channel between the first base station and the core network node, and cannot perform operation and maintenance on the first base station by using the channel between the first base station and the second base station. The active reset condition that is configured by the NMS device for the first base station may be that: if the first OM channel is in an interrupted state, and the channel between the first base station and the core network node is also in an interrupted state, the first base station performs the active reset operation.

Scenario 3: It is assumed that, in a networking architecture, the NMS device can perform operation and maintenance on the first base station by using the channel between the first base station and the core network node, and can also perform operation and maintenance on the first base station by using the channel between the first base station and the second base station. The active reset condition configured by the NMS device for the first base station may be that: if the first OM channel is in an interrupted state, and both the channel between the first base station and the second base station and the channel between the first base station and the core network node are in an interrupted state, the first base station performs the active reset operation.

It should be noted that configuring different active reset conditions for different networking architectures herein enables the first base station to perform the active reset operation in a timely manner, and also prevents the first base station from performing a reset operation in error.

For example, in a case of the foregoing scenario 1, the NMS device can perform operation and maintenance on the first base station only by using the channel between the first base station and the second base station, and cannot perform operation and maintenance on the first base station by using the channel between the first base station and the core network node. In this case, if the active reset condition is set to another manner, it is possible that the first base station cannot perform the active reset operation in a timely manner or performs the reset operation in error.

For example, assuming that the active reset condition is set to be that: if the first OM channel is in an interrupted state, and both the channel between the first base station and the second base station and the channel between the first base station and the core network node are in an interrupted state, the first base station performs the active reset operation. It is possible that the first base station does not perform active reset in a timely manner, because in this case, the first base station does not need to determine that the channel between the first base station and the core network node is also in an interrupted state.

Assuming that the active reset condition is set to be that: if the first OM channel is in an interrupted state, and the channel between the first base station and the core network node is also in an interrupted state, the first base station performs the active reset operation. It is possible that the first base station performs the reset operation in error, because in this case, the NMS device may perform operation and maintenance on the first base station by using the channel between the first base station and the second base station.

Figure 2:
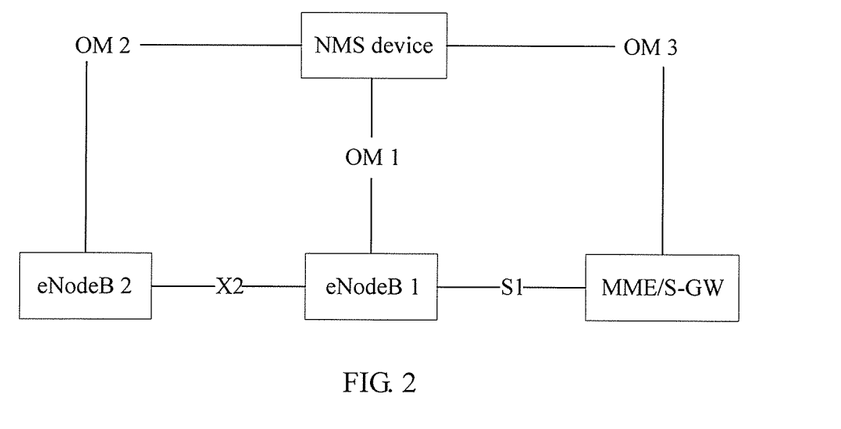
FIG. 2 is a schematic diagram of a method for maintaining a base station according to an embodiment of the present invention.

In order to further understand a specific implementation process of the embodiment shown in FIG. 1, the following uses an LTE system as an example for description with reference to FIG. 2. As shown in FIG. 2, FIG. 2 is a schematic diagram of a method for maintaining a base station according to an embodiment of the present invention. eNodeB 1 and eNodeB 2 are respectively the first base station and the second base station in the embodiment shown in FIG. 1. A first operation and maintenance OM channel between the NMS device and eNodeB 1 is marked as OM 1; a second operation and maintenance OM channel between the NMS device and eNodeB 2 is marked as OM 2; a third operation and maintenance OM channel between the NMS device and a core network node such as a mobility management entity (mobility management entity, MME) or a serving gateway (serving gate way, S-GW) is marked as OM 3. A channel between the first base station eNodeB 1 and the second base station eNodeB 2 is an X2 interface, and a channel between the first base station eNodeB 1 and the core network node such as the mobility management entity MME or the serving gateway S-GW is an S1 interface. A second channel between the NMS device and eNodeB 1 includes the X2 interface and the second OM channel OM 2; a third channel between the NMS device and eNodeB 1 includes the S1 interface and the third OM channel OM 3.

If the first OM channel OM 1 is in an interrupted state, the NMS device determines whether the second channel or the third channel is available; if the second channel is available, the NMS device may send an operation and maintenance command to the first base station through the second channel to perform operation and maintenance on the first base station; or, if the third channel is available, the NMS device may send an operation and maintenance command to the first base station through the third channel to perform operation and maintenance on the first base station.

Specifically, if the second channel is available, that the NMS device may send an operation and maintenance command to the first base station through the second channel to perform operation and maintenance on the first base station may include the following steps:

1. The NMS device sends the operation and maintenance command to the second base station eNodeB 2 through the second OM channel OM 2.

2. After receiving the operation and maintenance command, the second base station eNodeB 2 sends the operation and maintenance command to the first base station eNodeB 1 through the X2 interface.

3. After receiving the operation and maintenance command, the first base station eNodeB 1 executes the operation and maintenance command, and sends an execution result of the operation and maintenance command to the second base station eNodeB 2 through the X2 interface.

4. After receiving the execution result of the operation and maintenance command, the second base station eNodeB 2 sends the execution result of the operation and maintenance command to the NMS device through the second OM channel OM 2.

If the third channel is available, that the NMS device may send an operation and maintenance command to the first base station through the third channel to perform operation and maintenance on the first base station may include the following steps:

1. The NMS device sends the operation and maintenance command to the core network node, such as the MME or the S-GW, through the third OM channel OM 3.

2. After receiving the operation and maintenance command, the core network node, such as the MME or the S-GW, sends the operation and maintenance command to the first base station eNodeB 1 through the S1 interface.

3. After receiving the operation and maintenance command, the first base station eNodeB 1 executes the operation and maintenance command, and sends an execution result of the operation and maintenance command to the core network node, such as the MME or the S-GW, through the S1 interface.

4. After receiving the execution result of the operation and maintenance command, the core network node, such as the MME or the S-GW, sends the execution result of the operation and maintenance command to the NMS device through the third OM channel OM 3.

In a GSM system, the third channel between the NMS device and the first base station may include an OM channel between the NMS device and a base station controller (base station controller, BSC) and an Abis interface between the base station controller BSC and a base transceiver station BTS. In a UMTS system, the third channel between the NMS device and the first base station may include an OM channel between the NMS device and a radio network controller (radio network controller, RNC) and an Iub interface between the radio network controller RNC and a base station Node 13. When the OM channel between the NMS device and the first base station is in an interrupted state, and if the third channel between the NMS device and the first base station is available, the NMS device may send the operation and maintenance command to the first base station through the third channel to perform operation and maintenance on the first base station. For specific content, reference may be made to the embodiment shown in FIG. 1; for a signaling interaction process, reference may be made to descriptions of the embodiment shown in FIG. 2. Therefore, details are not described herein again.

Figure 3:
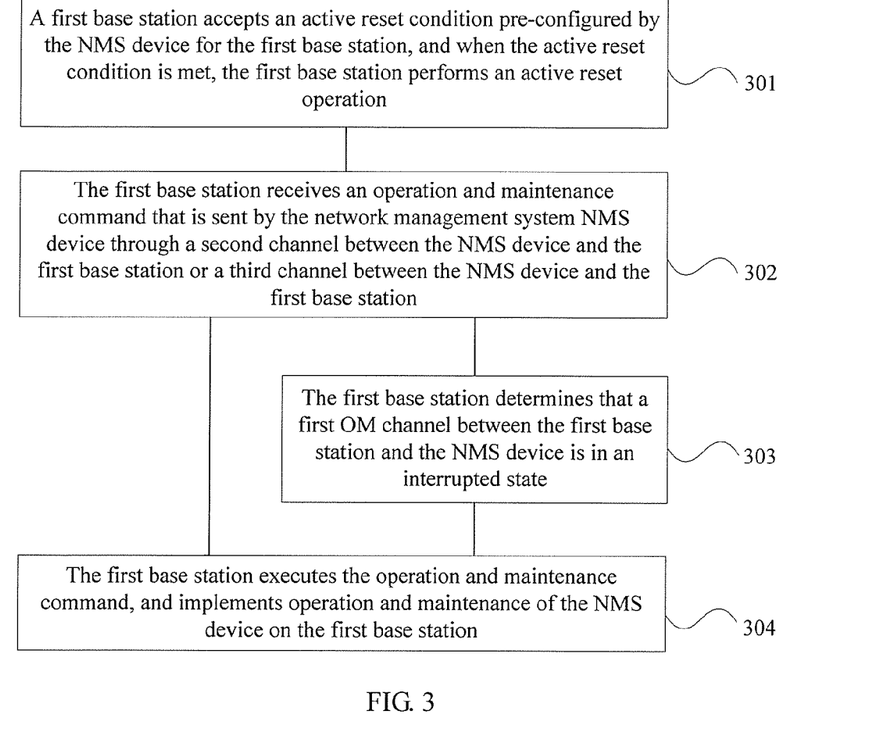
FIG. 3 is a flowchart of another method for maintaining a base station according to an embodiment of the present invention.

Referring to FIG. 3, a method for maintaining a base station according to an embodiment of the present invention includes:

Step 302: A first base station receives an operation and maintenance command that is sent by a network management system NMS device through a second channel between the NMS device and the first base station or a third channel between the NMS device and the first base station.

In step 302, the second channel includes a channel between the first base station and a second base station and a second OM channel between the second base station and the NMS device, and the third channel includes a channel between the first base station and a core network node and a third OM channel between the core network node and the NMS device.

Step 304: The first base station implements, according to the operation and maintenance command, operation and maintenance of the NMS device on the first base station.

A main difference between this embodiment and the embodiment shown in FIG. 1 lies in that: in the embodiment shown in FIG. 1, the method for maintaining a base station is described from a perspective of the NMS device, while in this embodiment, the method for maintaining a base station is described from a perspective of the base station. Therefore, for the method for maintaining a base station in this embodiment, reference may be made to descriptions of the embodiment shown in FIG. 1. For example, the operation and maintenance may include but is not limited to the following functions: configuration management, fault management, performance management, security management, software management, site deployment manage, device management, remote electrical tilt antenna management, inventory management, and commissioning management.

In the technical solution of this embodiment of the present invention, when a first OM channel between the first base station and the NMS device is in an interrupted state, the first base station may receive, through the second channel or the third channel, the operation and maintenance command sent by the NMS device, and implement, according to the operation and maintenance command, the operation and maintenance of the NMS device on the first base station. Therefore, it is not required to wait for operation and maintenance personnel to visit a site and perform an operation, so that costs of the site visit by the personnel are reduced, and a speed of response to a fault can be also increased. In addition, in a case in which the first base station cannot perform active reset or the first OM channel cannot be recovered by means of active reset, operation and maintenance can be still implemented on the first base station by using the second channel or the third channel in the technical solution provided by this embodiment of the present invention.

That the first base station implements, according to the operation and maintenance command, operation and maintenance of the NMS device on the first base station may specifically include:

performing, by the first base station, a reset operation according to a reset command sent by the NMS device; or reporting, by the first base station, device status information of the first base station to the NMS device according to a status query command sent by the NMS device; or uploading, by the first base station, local logs recorded by the first base station to the NMS device according to a log upload command sent by the NMS device, where the local logs include an operation and maintenance log and a run log that are recorded by the first base station.

The uploading, by the first base station, local logs recorded by the first base station to the NMS device according to a log upload command sent by the NMS device may specifically include:

uploading, by the first base station, the local logs to the NMS device through the second channel or the third channel; or if the first OM channel has already recovered to a normal state after the first base station implements, according to the operation and maintenance command, the operation and maintenance of the NMS device on the first base station, reporting, by the first base station, the local logs recorded by the first base station to the NMS device through the recovered first OM channel.

Generally, the first base station may perform the reset operation to recover the first OM channel to the normal state. In a case in which the first base station does not support an active reset operation, or in a case in which an active reset condition is not met although the first base station supports the active reset operation, the first base station may perform the reset operation after receiving the reset command sent by the first base station.

In addition, the first base station reports the device status information of the first base station to the NMS device, or uploads the local logs recorded by the first base station to the NMS device, so that the NMS device may fast analyze and locate a problem, thereby helping determine a reason why the first OM channel is interrupted and perform troubleshooting correspondingly.

In addition, optionally, before the step 302 is executed, the method may further include:

Step 301: The first base station accepts one of the following active reset conditions pre-configured by the NMS device for the first base station, and when the active reset condition is met, the first base station performs the active reset operation, where the active reset conditions include:

if the first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

In an actual operation, the first base station may accept one of the active reset conditions that are correspondingly pre-configured by the NMS device according to a different networking architecture of a communications network. For detailed content, reference may be made to descriptions of the embodiment shown in FIG. 1, and details are not described herein again. Then, when the active reset condition is met, the first base station may perform the active reset operation, and it is not required to wait for a reset operation command sent by the NMS device or wait for a site visit by personnel, thereby increasing a speed of response to a fault.

In order to ensure that only when the first OM channel is in an interrupted state, the first base station executes the operation and maintenance command received through the second channel or the third channel, optionally, between the step 302 and the step 304, the method may further include:

Step 303: The first base station determines that the first OM channel between the first base station and the NMS device is in an interrupted state.

Only when the first base station already determines that the first OM channel between the first base station and the NMS device is still in an interrupted state after the first base station receives the operation and maintenance command that is sent by the NMS device through the second channel or the third channel, the first base station executes the operation and maintenance command. The determining step in step 303 may be used to ensure that, when the first OM channel is in a normal state, the first base station does not execute an operation and maintenance command received from another channel, thereby improving security of operation and maintenance.

Figure 4:
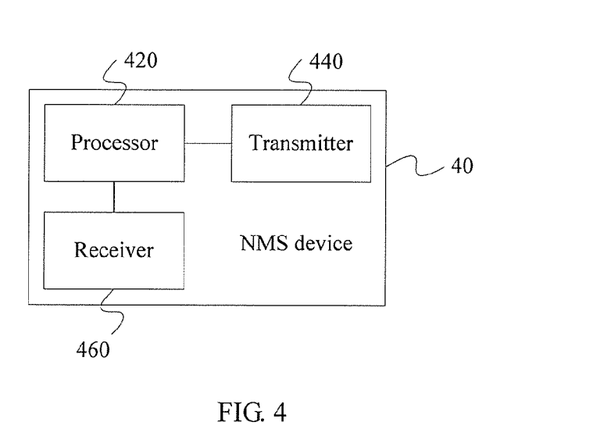
FIG. 4 is a schematic structural diagram of a network management system NMS device according to an embodiment of the present invention.

Referring to FIG. 4, a network management system NMS device 40 according to an embodiment of the present invention includes a processor 420 and a transmitter 440.

The processor 420 is configured to: when a first operation and maintenance OM channel between the NMS device and a first base station is in an interrupted state, determine whether a second channel between the NMS device and the first base station is available, or whether a third channel between the NMS device and the first base station is available, where the second channel includes a channel between the first base station and a second base station and a second OM channel between the second base station and the NMS device, and the third channel includes a channel between the first base station and a core network node and a third OM channel between the core network node and the NMS device.

Optionally, the processor 420 may be further configured to pre-configure one of the following active reset conditions for the first base station, to attempt to recover the first OM channel, where the active reset conditions include:

if the first OM channel is in an interrupted state, and the channel between the first base station and the second base station is also in an interrupted state, the first base station performs an active reset operation; or if the first OM channel is in an interrupted state, and the channel between the first base station and the core network node is also in an interrupted state, the first base station performs an active reset operation; or if the first OM channel is in an interrupted state, and both the channel between the first base station and the second base station and the channel between the first base station and the core network node are in an interrupted state, the first base station performs an active reset operation.

The transmitter 440 is configured to send an operation and maintenance command to the first base station through the second channel or the third channel to perform operation and maintenance on the first base station.

The transmitter 440 may be further specifically configured to send a reset command to the first base station through the second channel or the third channel, to instruct the first base station to perform a reset operation; or The transmitter 440 may be further specifically configured to send a status query command to the first base station through the second channel or the third channel, to acquire device status information of the first base station; or The transmitter 440 may be further specifically configured to send a log upload command to the first base station through the second channel or the third channel, to acquire local logs recorded by the first base station, where the local logs include an operation and maintenance log and a run log that are recorded by the first base station.

In addition, optionally, the NMS device 40 may further include:

a receiver 460, configured to:

receive the device status information of the first base station reported by the first base station; or receive the local logs recorded by the first base station and uploaded by the first base station, where the local logs include the operation and maintenance log and the run log that are recorded by the first base station.

The NMS device 40 may be the NMS device in the embodiments shown in FIG. 1 to FIG. 3, and may be applied to the foregoing method embodiments. For specific content, reference may be made to descriptions of the foregoing method embodiments, and details are not described herein again.

Figure 5:
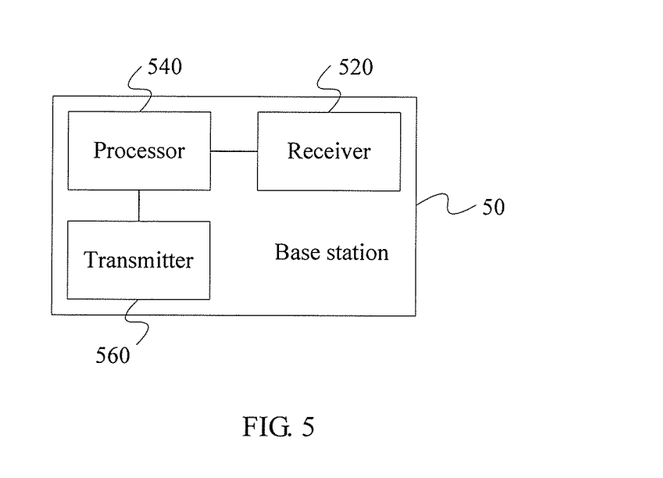
FIG. 5 is a schematic structural diagram of a base station according to an embodiment of the present invention.

Referring to FIG. 5, a base station 50 according to an embodiment of the present invention includes a receiver 520 and a processor 540.

The receiver 520 is configured to receive an operation and maintenance command that is sent by a network management system NMS device through a second channel between the NMS device and the first base station or a third channel between the NMS device and the first base station, where the second channel includes a channel between the first base station and a second base station and a second OM channel between the second base station and the NMS device, and the third channel includes a channel between the first base station and a core network node and a third OM channel between the core network node and the NMS device.

The receiver 520 may be further specifically configured to receive, through the second channel or the third channel, a log upload command sent by the NMS device; or the receiver 520 may be further specifically configured to receive, through the second channel or the third channel, a status query command sent by the NMS device; or the receiver 520 may be further configured to receive, through the second channel or the third channel, a log upload command sent by the NMS device.

The processor 540 is configured to implement, according to the operation and maintenance command, operation and maintenance of the NMS device on the first base station.

Optionally, the processor 540 may be further configured to accept one of the following active reset conditions preconfigured by the NMS device for the first base station, and when the active reset condition is met, perform an active reset operation, where the active reset conditions include:

if the first OM channel is in an interrupted state, and the channel between the first base station and the second base station is also in an interrupted state, the first base station performs the active reset operation; or if the first OM channel is in an interrupted state, and the channel between the first base station and the core network node is also in an interrupted state, the first base station performs the active reset operation; or if the first OM channel is in an interrupted state, and both the channel between the first base station and the second base station and the channel between the first base station and the core network node are in an interrupted state, the first base station performs the active reset operation.

Optionally, the processor 540 may be further configured to: before the processor 540 implements, according to the operation and maintenance command, the operation and maintenance of the NMS device on the first base station, determine that the first OM channel between the first base station and the NMS device is in an interrupted state.

Optionally, the base station 50 may further include:

a transmitter 560, configured to report device status information of the first base station to the NMS device; or the transmitter 560 is further configured to upload local logs recorded by the first base station to the NMS device, where the local logs include an operation and maintenance log and a run log that are recorded by the first base station.

The base station 50 may be the first base station in the embodiments shown in FIG. 1 to FIG. 3, and may be applied to the foregoing method embodiments. For specific content, reference may be made to descriptions of the foregoing method embodiments, and details are not described herein again.

Figure 6:
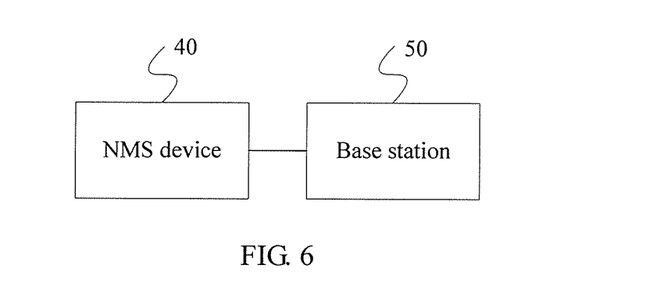
FIG. 6 is a schematic structural diagram of a communications system according to an embodiment of the present invention.

Referring to FIG. 6, a communications system according to an embodiment of the present invention includes:

the network management system NMS device 40 according to the foregoing embodiment, and the base station 50 according to the foregoing embodiment.

By using the device and system in the embodiments shown in FIG. 4 to FIG. 6, the methods for maintaining a base station according to the embodiments shown in FIG. 1 to FIG. 3 may be implemented. Compared with the prior art, by using the device and the system in the embodiments shown in FIG. 4 to FIG. 6, when a first operation and maintenance OM channel between a network management system NMS device and a first base station is in an interrupted state, the NMS device may send an operation and maintenance command to the first base station through a second channel between the NMS device and the first base station or a third channel between the NMS device and the first base station, to perform operation and maintenance on the first base station. Therefore, it is not required to instruct operation and maintenance personnel to visit a site and perform an operation, so that costs of the site visit by the personnel are reduced, and a speed of response to a fault can be also increased. In addition, in a case in which the base station cannot perform active reset or the first OM channel cannot be recovered by means of active reset, operation and maintenance can be still performed on the first base station by using the second channel or the third channel in the technical solutions provided by the embodiments of the present invention.

A person skilled in the art can understand that various illustrative logical blocks (illustrative logic block) and steps (step) that are listed in the embodiments of the present invention may be implemented by using electronic hardware, computer software, or a combination thereof. In order to clearly display the interchangeability (interchangeability) between the hardware and the software, functions of the foregoing various illustrative components (illustrative components) and steps have been generally described. Whether the functions are implemented by using hardware or software depends on particular applications and a design requirement of the entire system. For the particular applications, a person skilled in the art may use different methods to implement the functions, but it should not be construed that the implementation goes beyond the protection scope of the embodiments of the present invention.

The various illustrative logical blocks, modules, and circuits described in the embodiments of the present invention may implement or operate the described functions by using a general processor, a digital signal processor, an application-specific integrated circuit (ASIC), a field programmable gate array (FPGA) or another programmable logical apparatus, a discrete gate or transistor logic, a discrete hardware component, or a design of any combination thereof. The general processor may be a microprocessor. Optionally, the general processor may also be any traditional processor, controller, microcontroller, or state machine. The processor may also be implemented by a combination of computing apparatuses, such as a digital signal processor and a microprocessor, multiple microprocessors, one or more microprocessors with a digital signal processor core, or any other similar configuration.

Steps of the methods or algorithms described in the embodiments of the present invention may be directly embedded into hardware, a software module executed by a processor, or a combination thereof. The software module may be stored in a RAM memory, a flash memory, a ROM memory, an EPROM memory, an EEPROM memory, a register, a hard disk, a removable magnetic disk, a CD-ROM, or a storage medium of any other form in the art. Exemplarily, the storage medium may connect to a processor so that the processor may read information from the storage medium and write information to the storage medium. Alternatively, the storage medium may further be integrated into a processor. The processor and the storage medium may be arranged in an ASIC, and the ASIC may be arranged in a user terminal. Alternatively, the processor and the storage medium may also be arranged indifferent components of the user terminal.

In one or more exemplary designs, the functions described in the embodiments of the present invention may be implemented by using hardware, software, firmware, or any combination thereof. If the present invention is implemented by software, these functions may be stored in a computer-readable medium or are transmitted to the computer-readable medium in a form of one or more instructions or code. The computer-readable medium is either a computer storage medium or a communications medium that enables a computer program to move from one place to another. The storage medium may be an available medium that may be accessed by any general or special computer. For example, such a computer-readable medium may include but is not limited to a RAM, a ROM, an EEPROM, a CD-ROM, or another optical disc storage, a disk storage or another magnetic storage apparatus, or any other medium that may be used to bear or store program code, where the program code is in a form of an instruction or a data structure or in a form that can be read by a general or special computer or a general or special processor. In addition, any connection may be appropriately defined as a computer-readable medium. For example, if software is transmitted from a website, a server, or another remote resource by using a coaxial cable, an optical fiber computer, a twisted pair, a digital subscriber line (DSL) or in a wireless manner, such as infrared, radio, or microwave, the software is included in a defined computer-readable medium. The disc (disk) and the disk (disc) include a compressed disk, a laser disk, an optical disc, a DVD, a floppy disk, and a Blu-ray disc. The disk generally copies data by a magnetic means, and the disc generally copies data optically by a laser means. The foregoing combination may also be included in the computer-readable medium.

According to the foregoing description of this specification in the present invention, technologies in the art may use or implement the content of the present invention. Any modification based on the disclosed content shall be considered obvious in the art. The basic principles described in the present invention may be applied to other variations without departing from the essence and scope of the present invention. Therefore, the content disclosed in the present invention is not limited to the described embodiments and designs but may also be extended to a maximum scope that is consistent with the principles and disclosed new features of the present invention.

What is claimed is:

1. A base station, wherein the base station is a first base station, comprising:
   a processor, configured to reset the first base station on condition that a first operation and maintenance (OM) channel between the first base station and a network management system (NMS) device is in an interrupted state, and a channel between the first base station and a core network node is also in an interrupted state;
   a receiver, configured to receive an OM command from the NMS device via a channel between the first base station and the NMS device; wherein the channel between the first base station and the NMS device comprises a channel between the first base station and a second base station, and a second OM channel between the second base station and the NMS device; and
   the processor is further configured to implement, according to the OM command, operation and maintenance of the NMS device on the first base station.

2. The base station according to claim 1, wherein the processor is further configured to:
   before the processor implements, according to the OM command, the operation and maintenance of the NMS device on the first base station,
   determine that the first OM channel between the first base station and the NMS device is in an interrupted state.

3. The base station according to claim 1, wherein:
   the processor is configured to control the first base station to perform a reset operation according to a reset command sent, when the OM command received from the NMS device is the reset command.

4. The base station according to claim 1, wherein:
   the processor is configured to control the first base station to report device status information according to a reset command sent, when the OM command received from the NMS device is the reset command; and
   the first base station further comprises:
   a transmitter, configured to report device status information of the first base station to the NMS device.

5. The base station according to claim 1, wherein:
   the processor is configured to control the first base station to upload local logs, according to a log upload command, when the OM command received from the NMS device is the log upload command; and
   the first base station further comprises:
   a transmitter, configured to upload local logs recorded by the first base station to the NMS device, when the OM command send by the NMS device is the log upload command;
   wherein the local logs comprise an OM log and a run log that are recorded by the first base station.

6. The base station according to claim 1, wherein:
   the channel between the first base station and the second base station is an X2 interface.

7. A method for maintaining a base station, comprising:
   resetting, by a first base station, the first base station on condition that a first operation and maintenance (OM) channel between the first base station and a network management system (NMS) device is in an interrupted state, and a channel between the first base station and a core network node is also in an interrupted state;
   receiving, by the first base station, OM a command from the NMS device via a channel between the first base station and the NMS device; wherein the channel between the first base station and the NMS device comprises a channel between the first base station and a second base station, and a second OM channel between the second base station and the NMS device; and
   implementing, by the first base station according to the OM command, operation and maintenance of the NMS device on the first base station.

8. The method according to claim 7, wherein:
   before implementing, by the first base station according to the OM command, operation and maintenance of the NMS device on the first base station, the method further comprises:
   determining, by the first base station, that the first OM channel between the first base station and the NMS device is in an interrupted state.

9. The method according to claim 7, wherein implementing, by the first base station according to the OM command, the operation and maintenance of the NMS device on the first base station, comprises:
   performing, by the first base station, a reset operation according to a reset command, when the OM command received from the NMS device is the reset command.

10. The method according to claim 7, wherein implementing, by the first base station according to the OM command, the operation and maintenance of the NMS device on the first base station, comprises:
    reporting, by the first base station, device status information of the first base station to the NMS device according to a status query command, when the OM command received from the NMS device is the status query command.

11. The method according to claim 7, wherein implementing, by the first base station according to the OM command, the operation and maintenance of the NMS device on the first base station, comprises:
    uploading, by the first base station, local logs recorded by the first base station to the NMS device according to a log upload command received from the NMS device, when the OM command send by the NMS device is the log upload command;

wherein the local logs comprise an operation and maintenance log and a run log that are recorded by the first base station.

12. The method according to claim 11, wherein:

uploading, by the first base station, the local logs recorded by the first base station to the NMS device according to a log upload command received from the NMS device, comprises:

when the first OM channel has already recovered to a normal state after the first base station implements the operation and maintenance of the NMS device on the first base station, reporting, by the first base station, the local logs to the NMS device through the recovered first OM channel.

13. The method according to claim 7, wherein:

the channel between the first base station and the second base station is an X2 interface.

14. A network management system (NMS) device, comprising:

a processor, configured to set an active reset condition for a first base station, and determine that the first OM channel between the NMS device and the first base station is in an interrupted state, wherein the active reset condition comprises a first operation and maintenance (OM) channel between the first base station and a network management system (NMS) device is in an interrupted state, and a channel between the first base station and a core network node is also in an interrupted state; and a transmitter, configured to send an OM command to the first base station via a channel between the first base station and the NMS device, wherein the channel between the first base station and the NMS device comprises a channel between the first base station and a second base station, and a second OM channel between the second base station and the NMS device.

15. The NMS device according to claims 14, wherein:

the transmitter is configured to send a reset command to the first base station via the channel between the first base station and the NMS device to instruct the first base station to perform a reset operation.

16. The NMS device according to claims 14, wherein:

the transmitter is configured to send a status query command to the first base station via the channel between the first base station and the NMS device to acquire device status information of the first base station; and the NMS device further comprises:

a receiver, configured to receive the device status information of the first base station.

17. The NMS device according to claims 14, wherein:

the transmitter is configured to send a log upload command to the first base station via the channel between the first base station and the NMS device to acquire local logs recorded by the first base station, wherein the local logs comprise an OM log and a run log that are recorded by the first base station; and the NMS device further comprises:

a receiver, configured to receive the local logs recorded by the first base station.

* * * * *